United States Patent Office 3,591,390
Patented July 6, 1971

3,591,390
TREATMENT OF COTTAGE CHEESE CURD
Gary D. Flickinger and Edwin G. Stimpson, Northbrook, Ill., assignors to National Dairy Products Corporation, New York, N.Y.
No Drawing. Filed Apr. 29, 1968, Ser. No. 725,141
Int. Cl. A23c 19/00
U.S. Cl. 99—115
8 Claims

ABSTRACT OF THE DISCLOSURE

A method is provided for treating cottage cheese or similar cheese so as to provide the desired texture in the finished product. In accordance with the method, an agent is added to the cottage cheese curd so as to reduce the firmness. The agent may also be used to provide desired texture of the curd when acidic materials are added to the cottage cheese curd. The agents used to texture the cottage cheese curd are selected from phosphate or citrate compounds or mixtures thereof.

---

The present invention relates generally to a method for making cottage cheese and, more particularly relates to an improved method for the manufacture of cottage cheese, whereby the curd identity is maintained but modified and desired curd characteristics are provided in the finished product.

Skim milk has long been used to produce various dairy products, such as cottage cheese. A typical commercial cottage cheese make procedure is as follows:

Inoculation.—Pasterurized skim milk is mixed with a suitable bacterial starter, such as a *Streptococcus lactis* starter culture, rennet being usually added in order to facilitate coalescing of the protein of the skim milk to provide a coagulum.

Setting.—The milk is allowed to develop acidity so that the protein of the milk coalesces, or sets, to provide a coagulum. In this period, acid is developed in the milk because of the action of the starter. The setting period is normally more than about four hours and setting is usually effected at a temperature of from 85° F. to 92° F. Longer setting periods have been employed, for example 12 to 16 hours, at a temperature of 70° F. to 80° F. with smaller amounts of a lactic starter culture. The activity of the starter also affects the setting time.

Cutting.—After the curd is set, that is after a coagulum is formed, the coagulum is cut into small pieces to provide curd particles. The curd particles are usually of cube shape. Conventionally, the coagulum is cut to provide curd when the titratable acidity of the whey by a 0.10 N. basic solution is approximately 0.50 percent or above, expressed as equivalent lactic acid. However, when the milk is given high heat treatment or varies in character, other cutting acidities are used. After cutting, the curd and whey begin to separate.

Cooking.—The curd is then cooked in the whey with careful stirring by gradually heating the whey to a temperature between about 120° F. and 130° F. Careful attention must be given to the curd and whey at this stage to prevent uneven heating and to prevent overcooking of the curd. Cooking is carried out until a "cooked curd" is provided. This cooked curd has a particulate characteristic which is well recognized by the cheesemaker. In general, the cooked curd particles will not coalesce or stick together after cooling of the curd and will readily separate even after application of the hand pressure. The characteristics of cooked curd are know to the cheesemaker. It has, in general, been a problem for the cheesemaker to provide a cooked curd that is not overcooked. Overcooked curd is too firm and has a case hardened exterior which is considered undesirable for consumer use. When curd has been overcooked during the cooking step it has generally been necessary to divert the curd from that batch to purposes other than cottage cheese manufacture. Such diversion is, of course, expensive and time-consuming.

Whey separation. The whey is then drained from the curd.

Washing.—After the whey is separated from the curd, the curd is subjected to several washings with cool water. After the final washing, the curd is again drained. It is also known to wash the curd with heated water to provide a cottage cheese curd that has improved keeping qualities. Such known methods for washing cottage cheese curd with hot water also sometimes provide curd that is too firm.

The curd is now in substantially finshed form and may be packed in containers for storage and for shipping. It is conventional to add a creaming mixture to the curd prior to packaging so as to provide a creamed curd. It is also sometimes desirable to add other flavoring materials to cottage cheese prior to packaging to provide a variety of flavored cottage cheese products, such as fruit salad, pears, or apricots. However, a problem arises when acidic flavoring materials, such as pineapple, marinated vegetables, peaches, cultured cream dressings, or other acidic type fruits or vegetables are added or when acidified cottage cheese creaming mixtures are added to the cottage cheese curd. Acidic materials lower the pH of the cottage cheese which results in hardening or firming of the cottage cheese curd. It has long been a goal of the cottage cheese maker to provide a method for maintaining desireable texture and body characteristics in the curd when acidic materials are provided in finished cottage cheese.

Accordingly, it is an object of the present invention to provide an improved process for the manufacture of cottage cheese. It is a further object of the present invention to provide an improved process for the manufacture of cottage cheese which provides a desired curd body in the finished cottage cheese product. It is a still further object of the present invention to provide a process for providing desirable body and texture in cottage cheese curd which has become too firm. It is another object of the present invention to provide a method for using acidic materials in cottage cheese without providing undesired texture or body in the finished cottage cheese curd.

Further objects and advantages of the present invention will be apparent from a study of the following detailed description:

In general, in the practice of the invention curd particles may be provided from skim milk by any of various known techniques for making cottage cheese. When it has been determined by experienced cheese-making personnel that the curd particles have an undesired level of firmness, the method of the present invention is used to treat the curd so as to provide a desired texture or body in the curd. In accordance with the invention, curd particles having an undesired degree of firmness are treated with a solution of an agent to achieve this desired texture. After storage of the treated cottage cheese for a period of time, the desired texture is provided. In this connection, the texture of the curd is related to the overall mouth feel of the curd which is usually referred to as the "body" of the curd. The agents of the invention may also be used to provide desired texture when acidic materials, such as pineapple or cultured cream dressing, are added to cottage cheese curd.

The agents of the invention are edible phosphate or citrate compounds. Compounds which have been found to be suitable for the invention include disodium phosphate, trisodium phosphate, sodium hexametaphosphate, sodium tripolyphosphate, tetrasodium pyrophosphate, sodium aluminum phosphate, dicalcium phosphate, dipotassium phosphate, tripotassium phosphate, sodium citrate, potassium citrate, and combinations thereof. A particularly preferred compound for reasons of economy and taste is disodium phosphate.

It is not completely understood how the agents of the present invention affect the body of cottage cheese curd. While not wishing to be bound by any theory it is believed that the agents of the invention act both as a sequestering agent and function as buffers. It is known that various cations, particularly calcium, influence the physical characteristics of curd obtained from milk. It is believed that the agents of the invention block or remove cations from the casein in the curd and prevent cations from exerting a firming effect.

In addition, the agents act as buffering compounds and prevent acidic materials from exerting a firming effect. In this connection, alkaline materials, such as sodium hydroxide or potassium hydroxide, may also be used to prevent the curd from forming undesirable texture or body when acidic materials are added to the curd. However, it has been determined that such alkaline materials must be used at levels such that the pH of the curd is raised to an undesirable level, i.e., about 5.3. Such high pH levels affect the keeping qualities, the mouth feel and the flavor of the cottage cheese. The agents of the present invention are effective to prevent undesirable texture and body characteristics in the cottage cheese curd while maintaining the pH below about 5.3.

In general, it has been found that the agent should be added to the cottage cheese curd at a level sufficient to provide from about 0.10 to about 1.1 weight percent of the agent based on the weight of drained cottage cheese curd. Drained cottage cheese curd usually has about 17.5 percent by weight of solids, but may vary from about 15.0 to about 20.0 percent by weight of solids. While higher levels of the agent may be used to provide an even greater degree of texturizing of cottage cheese curd, higher levels tend to provide an undesired flavor.

As previously indicated, the agent may be added to cottage cheese curd having a suitable body but to which an acidic material will be later added. Acidic materials which might be added to the cottage cheese curd include pineapple, marinated vegetables, peaches, citrus fruits, syrups provided from such materials, cultured dressings or combinations of these materials. As before indicated, it has long been desired in the cheesemaking industry to provide cottage cheese with acidic additives. The phenomena of curd firming is well known in the industry, and it has not before been possible to provide a prepackaged combination of cottage cheese and an acidic material without causing an effect on the body of the curd.

The agent may be added to cottage cheese by various methods. For example, a dispersion of the agent in a suitable fluid or media may be added directly to uncreamed cottage cheese curd, or the agent may be dispersed in a creaming mixture and thereafter added to the cottage cheese curd. Other methods of addition are also suitable, such as adding a dispersion of the agent to creamed cottage cheese curd or adding a dispersion of the agent to an acidic material and thereafter adding the mixture to creamed or uncreamed cottage cheese curd.

Certain features of the present invention will be more particularly described in the following examples. However, such examples are not intended to in any way limit the scope of the invention which is defined in the appended claims.

EXAMPLE I

Two hundred gallons of skim milk containing 8.8 percent by weight solids is used to make cottage cheese. The skim milk is first pasteurized at a temperature of 165° for 30 minutes. The skim milk is introduced into a vat at 90° F. to provide a suitable environment for the starter. When an acidity of 0.50 percent equivalent lactic acid has been obtained a coagulum is formed. The coagulum is cut with conventional cottage cheese knives to provide quarter inch curd cubes in whey. The curd is then cooked in the whey until the curd reaches a temperature of 150° F. The whey is then drained and the curd is washed with two successive washings of 60° F. water. It is determined at this time that the curd is too firm. The curd is then creamed with a 40° F. cottage cheese creaming mixture.

A solution of disodium phosphate is then prepared. The solution contains about 10 weight percent disodium phosphate. The solution of disodium phosphate is then added to the creamed cottage cheese to provide a level of 0.4 percent by weight of disodium phosphate per pound of drained cottage cheese curd.

The blended mixture of creamed cottage cheese and disodium phosphate is then stored at a temperature of 40° F. overnight. It is then determined that the curd particles have been restored to a desired texture and the curd is softened. Other curd from the same batch is creamed and stored without addition of disodium phosphate. It is determined that after storage the curd firmness is still too high.

EXAMPLE II

Cottage cheese is prepared in accordance with the procedure of Example I with the exception that the curd is cooked to a temperature of 125° F. It is determined after preparation of the creamed cottage cheese that the curd firmness is at a desirable level. Disodium phosphate is then added to pineapple syrup so as to provide a level of 7.2 weight percent of disodium phosphate. The disodium phosphate solution is then added to the creamed cottage cheese at a level sufficient to provide 0.25 percent of disodium phosphate per pound of drained cottage cheese curd. Pineapple chunks are then added to the creamed cottage cheese at a level sufficient to provide 15 weight percent based on the creamed cottage cheese. The cottage cheese with added pineapple is then stored at a temperature of 40° F. for a period of one day. The cottage cheese is tested and it is found that no firming of the cottage cheese has been effected and that the cottage cheese curd has a desirable texture.

A control sample of creamed cottage cheese is also prepared to which no disodium phosphate is added. After addition of the pineapple chunks and storage at 40° F. for one day the curd firmness has increased to a point where the cottage cheese is rated unacceptable.

The method of the invention may be used to provide desirable curd body and texture in cottage cheese curd when it has been determined that curd firmness is too high. The method may also be used to provide desirable texture and body in cottage cheese curd when acidic materials are added to the curd.

Various of the features of the invention are set forth in the appended claims.

What is claimed is:

1. A method for treating particulate cottage cheese curd having an undesired level of firmness so as to provide a particulate curd of desired body and firmness which method comprises adding to said curd an agent, said agent being selected from the group consisting of disodium phosphate, sodium hexametaphosphate, tetrasodium pyrophosphate, sodium aluminum phosphate, dicalcium phosphate, potassium phosphate, dipotassium phosphate, sodium citrate, potassium citrate or mixtures thereof, said agent being added at a level of from about 0.10 to about 0.90 percent by weight based on the weight of drained particulate cottage cheese curd, and storing said curd for a period of time sufficient to establish the desired body.

2. A method in accordance with claim 1 wherein the agent is disodium phosphate.

3. A method in accordance with claim 1 wherein the agent is added to the curd as a fluid dispersion.

4. A method for providing a desired body and firmness in particulate cottage cheese curd when acidic materials are added to the particulate curd which method comprises adding to said curd an agent, said agent being selected from the group consisting of disodium phosphate, sodium hexametaphosphate, tetrasodium pyrophosphate, sodium aluminum phosphate, dicalcium phosphate, potassium phosphate, dipotassium phosphate, sodium citrate, potassium citrate, or mixtures thereof, said agent being added at a level of from about 0.10 to about 0.90 percent by weight based on the weight of drained particulate cottage cheese curd.

5. A method in accordance with claim 4 wherein the agent is disodium phosphate.

6. A method in accordance with claim 4 wherein the agent is added to the curd as a fluid dispersion.

7. A method in accordance with claim 4 wherein the acidic material which is added to the cottage cheese curd is pineapple.

8. The method of claim 4 wherein said acidic material is selected from pineapple, marinated vegetables, peaches, citrus fruits, cultured dressings or combinations thereof.

References Cited

UNITED STATES PATENTS

| | | | |
|---|---|---|---|
| 1,910,195 | 5/1933 | Waters | 99—115 |
| 2,163,778 | 6/1939 | Draisbach | 99—162 |
| 2,617,730 | 11/1952 | Long et al. | 99—117 |
| 3,411,920 | 11/1968 | Holder et al. | 99—116 |
| 3,310,406 | 3/1967 | Webster | 99—117X |

FOREIGN PATENTS

| | | | |
|---|---|---|---|
| 1,171,716 | 6/1964 | Germany | 99—115 |

LIONEL M. SHAPIRO, Primary Examiner

D. M. NAFF, Assistant Examiner

U.S. Cl. X.R.

99—162